May 18, 1943. W. L. WOOLF 2,319,282
SPROCKET FOR FEEDING FILM
Filed Feb. 20, 1940 2 Sheets-Sheet 1

INVENTOR
WILLIAM L. WOOLF.
BY
Geo. M. Dowe.
ATTORNEY

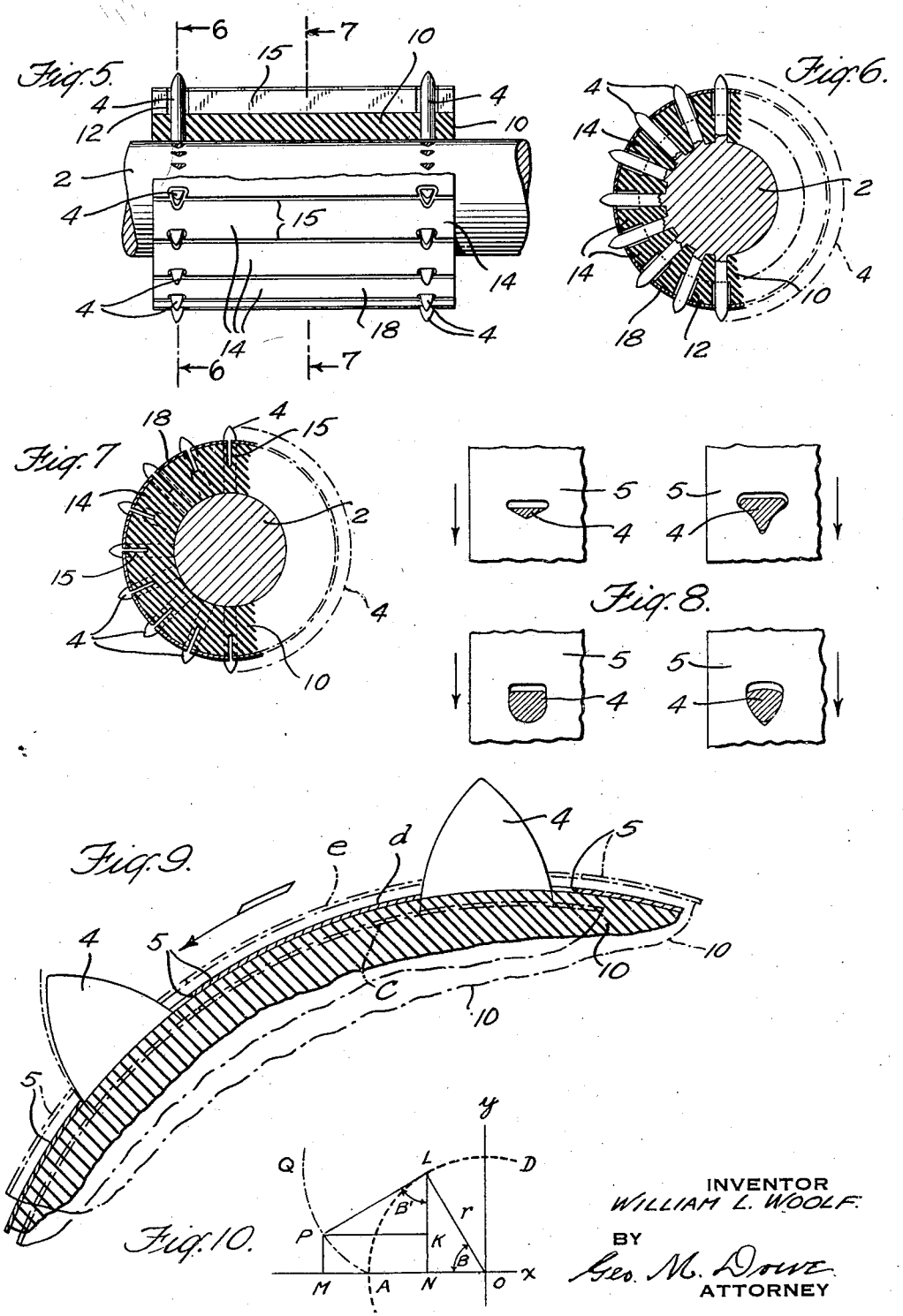

Patented May 18, 1943

2,319,282

UNITED STATES PATENT OFFICE 2,319,282

SPROCKET FOR FEEDING FILM

William L. Woolf, Bayside, Long Island, N. Y., assignor, by mesne assignments, to Amertype Recordgraph Corporation, Elizabeth, N. J., a corporation of Delaware Application February 20, 1940, Serial No. 319,836

5 Claims. (Cl. 74—243)

This invention relates to a sprocket wheel for feeding a perforated film and more particularly to a sprocket wheel for feeding a film having a plurality of sound tracks thereon.

The invention has for its objects an improved type of sprocket wheel wherein compensation is provided for expansion and contraction of the film; the elimination of side slipping of the film and the diminishing of sprocket modulation.

A further object is to conserve space and thereby permit an increase in the number of sound tracks which may be recorded on a film of definite width.

A feature of the invention relates to a sprocket wheel having a core of hard material, such as metal, provided with sprocket teeth, the core being covered with a drum of resilient material through which the sprocket teeth project, there being in a preferred embodiment, a depression or moat adjacent each tooth. The resilient material may be chosen of such compressibility as to yield to the compression of the film under film tension, thereby relieving the pressure of the edges of the film perforations against the sprocket teeth.

Another feature of the invention relates to a sprocket tooth which presents two feeding surfaces to the film which surfaces are opposingly oblique to the direction of movement of the film, thereby preventing side slipping of the film.

A further feature of the invention relates to a sprocket wheel, each portion of the film engaging face of a tooth of said sprocket conforming to a curve of such character that the sprocket tooth will leave the perforation in the film with slight clearance, thereby avoiding what is known as "sprocket modulation". By sprocket modulation is meant some irregular movement or vibration given to the film, one of the causes of which is due to a sprocket tooth failing to leave the perforation with the necessary smoothness.

A still further feature of the invention relates to a sprocket wheel having a single set of sprocket teeth by which the film is fed. Such a construction permits a greater number of sound tracks to be produced on the film and also avoids complications due to lateral expansion and contraction of the film.

Further features and advantages of the invention will become apparent from the following detained description and claims when taken in connection with the accompanying drawings in which:

Figure 5 is a view similar to Figure 3 showing a modification in the arrangement of the resilient drum;

Figure 6 is a section on the line 6—6 of Figure 5;

Figure 7 is a section on the line 7—7 of Figure 5;

Figure 8 is a composite detail view of the different shapes which a sprocket tooth may take;

Figure 9 is an enlarged view illustrating the manner in which the sprocket compensates for expansion and contraction of the film, and diminishes sprocket modulation; and Figure 10 is a diagram showing how the equation for the shape of the feeding face of a sprocket tooth may be derived.

Figure 1:
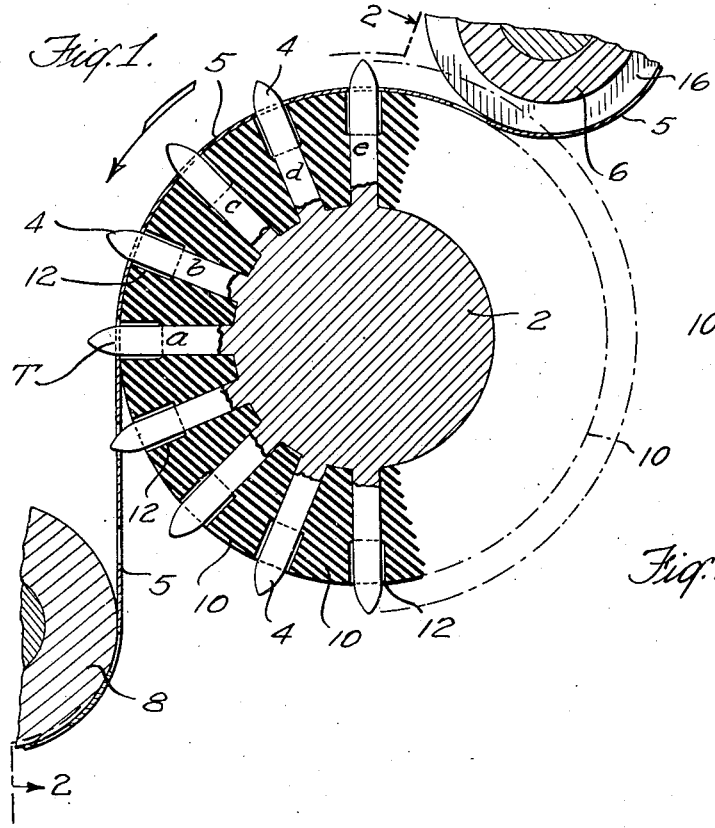
Figure 1 is a section on the line 1—1 of Figure 2.
Figure 2:
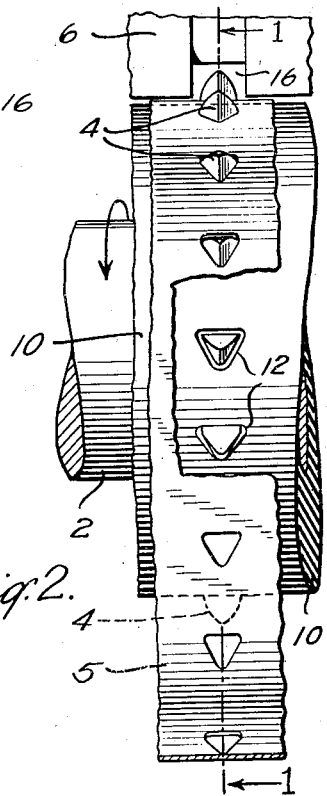
Figure 2 is a front elevation of a sprocket wheel having a single row of teeth and showing a portion of the film in engagement with the teeth of the same.
Figure 3:
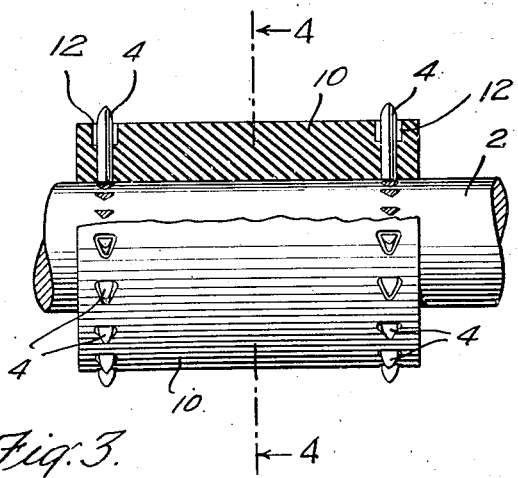
Figure 3 is an elevation of a sprocket wheel with double row of teeth and with a portion of the resilient drum shown in section.
Figure 4:
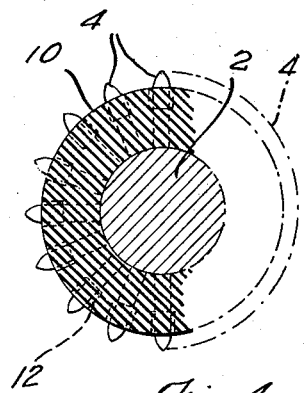
Figure 4 is a section on the line 4—4 of Figure 3.

Referring to the drawings and particularly to Figures 1 and 2, the sprocket wheel of the present invention is provided with a core 2 of hard material such as metal, and formed integral therewith or securely attached thereto are the sprocket teeth 4. The core 2 may also constitute the axis about which the sprocket wheel rotates in feeding the film. The film 5 passes from a suitable source of supply about an idle roller 6 and over the sprocket wheel from which it passes in a tangential direction to a roller 8, about which the film is drawn with suitable tension in any manner well known in the art.

The core 2 of the sprocket wheel is surrounded by a drum 10 of resilient material, such as rubber, or the like. In the construction of the sprocket as shown in Figures 1 to 4, the drum 10 extends circumferentially, continuously about the core on either side of the single row of teeth in Figs. 1 and 2 between the rows of teeth and in Figures 3 and 4. About each tooth however, there is a depression 12, constituting a moat, surrounding each sprocket tooth, as clearly shown in Figure 1.

In the form of sprocket wheel shown in Figures 5, 6 and 7, the resilient material constituting the drum is arranged in the form of sectors 14, each sector being secured to the core, but each sector being slightly spaced from its adjacent sector as shown at 15, Figure 5. As in the Figures 1 to 4 constructions, a depression or moat is also formed about each tooth, which teeth project through the drum along a radius which lies between two adjacent sectors.

While it is desirable that the drum be formed of resilient or yielding material, it is also desirable that its surface be as smooth as it is practically possible to make it. To accomplish this result, the outer surface of the resilient material may be made smooth by polishing or by the addition of material having a smooth surface, the coefficient of friction of which is less than that of the normal surface of the resilient material. In Figure 7, the reference character 18 indicates such surface which may be formed on the resilient material or which may be a thin material secured to the resilient material. In any case this surface is made smooth so that the friction between it and the film will be as small as possible.

Since one of the objects of the invention is to conserve space, and thereby permit an increased number of sound tracks to be recorded on a film of a given width, the form of sprocket wheel shown in Figures 1 and 2 has but a single set of teeth instead of two sets of teeth adjacent each edge. In this construction the roller 6 is recessed at 16, Figure 2, to provide the proper clearance between said roller and the sprocket teeth.

In order to prevent side slip of the film and also to overcome complications in the feeding of the film arising from any change in its lateral dimension, the sprocket teeth are so shaped as to present two lines of pressure to the film which lines of pressure are opposingly oblique to the direction of the film motion. When a sprocket tooth of such form is used, it is of course to be understood that those portions of each perforation in the film that is engaged by a sprocket tooth, corresponds appropriately in shape to the engaging face of the tooth. The teeth may take a number of shapes as illustrated in Figure 8. The tooth may be triangular at its base, as shown in the first view of Figure 8. It may be semi-circular as shown in the second view; or concave as shown in the third view; or convex and parabolic as shown in the fourth view. The point of the tooth, except in the semi-circular form, is somewhat rounded so that this portion of the tooth does not engage the film, thus reducing the tendency of the sprocket to rupture the film. The oblique surfaces however, engage the film and feed it as the sprocket wheel is rotated. As is usual the length of each perforation is somewhat greater than the base of a tooth from front to rear.

Whether the sprocket teeth have one or another of the several shapes hereinabove referred to, it is highly desirable that those portions of each tooth which come into feeding relation with the edge or edges of a perforation in the film, be of such contour that the sprocket tooth leaves the perforation with the utmost smoothness.

It is well known that if a strip or string is unwound from a curved surface, and kept sufficiently taut so that the string or strip is always tangent to some point on the curved surface, then the locus of any point on the strip moves along a curve which is the involute of the curve from which it is unwound. Since the drum in the present instance is circular in cross-section, the locus of any point on the film, as the film passes from the surface of the drum in a direction tangential thereto, will conform to a curve which is the involute of a circle whose radius is that of the drum.

Referring to Figure 1, it will be noted that the film leaves the sprocket wheel in a tangential direction, the film being tangent to the surface of the drum at a point marked T.

The tooth $a$ has just completed its feeding action and is about to pass out of the perforation in the film, the teeth $b$, $c$, $d$ and $e$ continue to feed the film in the direction of the arrow. In order that the sprocket modulation heretofore referred to may be diminished, it is desirable that a tooth, on leaving a perforation in the film, be not in constant contact with the edge or edges of the perforation but that there be a clearance beginning at the base of the tooth and continuing during the time that the tooth is within the film perforation. In the present design of sprocket tooth, the leading face is so shaped that a projection of the tooth on a plane perpendicular to the film conforms, not to a true involute of the circle of the drum, but to a modification of the involute thereof. This modified involute may be expressed by the equations (a) $$x = r \cos B + \frac{2\pi rB}{360°} \sin B$$

(b) $$y = r \sin B - \frac{f 2\pi rB}{360°} \cos B$$

where $r$ is the radius of the drum and $B$ the angle at the center of the drum formed by radii, one of which passes through the base of a tooth at its point of contact with the drum, and the other at the point of tangency of the film and drum. The factor $f$, is a quantity slightly less than unity. That the above equation is a modified involute of a circle may be seen from a consideration of the diagram in Figure 10. It becomes the equation of a true involute when $f$ equals unity.

In said figure O is the center of a circle the arc of which is indicated as AD which may be a portion of the surface of the sprocket drum. LP is a tangent to the radius of the circle and it is desired to find the coordinates of a point on the line LP as it moves from A to P maintaining its tangency to the circle at all times. From the point of tangency L, a perpendicular LN is drawn to the line OM which is the $x$ axis and PK is drawn parallel to MN.

Then the coordinates of the point P are (I) $$x = ON + MN = ON + KP$$

and (II) $$y = MP = NL - KL$$

Since the triangles ONL and LKP are similar, angle $B$ = angle $B'$, then $$ON = r \cos B \text{ and } MN = LP \sin B$$

but $$LP = \text{arc } LA = \frac{2\pi rB}{360°}$$

substituting in I, then (III) $$x = r \cos B + \frac{2\pi rB}{360°} \sin B$$

also $$NL = r \sin B \text{ and } KL = LP \cos B = \frac{2\pi rB}{360°} \cos B$$

(IV) $$y = r \sin B - \frac{2\pi rB}{360°} \cos B$$

By comparing the Equations $a$ and $b$ on the previous page with III and IV, it will be noted that the $x$ coordinate is the same in both ($a$) and III while the $y$ coordinate in Equation $b$ is larger than the $y$ coordinate in Equation IV, although the point at which the curve of the tooth meets the surface of the drum is the same in both cases. This may readily be shown by considering that the angle B is zero. Under these conditions $x$ becomes one which is the radius of the drum, and $y$ becomes zero.

Instead of writing the $y$ coordinates as in Equation $b$, it may be written as follows:

$$y = gr \sin B - \frac{2\pi grB}{360°} \cos B$$

or it may be written $$y = hr \sin B - \frac{r2\pi B}{360°} \cos B$$

In both of the latter equations for the value of $y$, the value $g$ and $h$, are each slightly greater than unity, instead of being less than unity, as is the case for the value of $f$ in Equation $b$.

By writing the value of $y$ in the several ways indicated, the departure of the curve from a true involute will vary in slightly different manners but in each case, the value of $y$ for the modified equation will be greater than the value for $y$ in the equation for the involute of the circle. This means that as the tooth of the sprocket leaves a perforation, it will pass out of contact with the edge of the perforation and gradually get further away from such edge. That is to say the engaging face of a tooth conforms to a curve which lies radially within an involute drawn from the root of a sprocket tooth.

While it is desirable that there be a slight clearance between the tooth and the edge of the perforation engaged thereby, as the tooth leaves the perforation, it is also desirable that this clearance be small.

The value of $f$, $g$, or $h$, in the above equations will therefore be chosen to accomplish this result. In Equation $b$ on page 2, the value of $f$ for example may be between .86 and .9999+. In the formula at the bottom of page 3, where the factor $g$, is introduced in both terms of the equation the value of $g$, may be, by way of example, between 1.1 and 1.8. In the formula at the top of page 3 the value of $h$, for example may be between 1.01 and 1.1. These values are not to be taken as necessary limitations but as examples indicating practical limits only.

Due to atmospheric and other conditions the film expands or contracts from what may be considered a normal length and it is found in practice that the maximum change amounts to approximately one-half of one per cent. Let it be assumed that the distance from the feeding face of one sprocket tooth to the feeding face of the next following sprocket tooth is the same as the distance between the leading edge of one perforation and the leading edge of the following perforation when the film is in its most contracted state. Then the film will rest against the surface of the drum and the leading edges of two adjacent perforations will be in contact with the feeding faces of two adjacent teeth.

In Figure 9 a portion of the drum 10 is shown on an enlarged scale and two adjacent teeth 4. That portion of the film between two adjacent teeth is indicated by the letter $c$. This represents the position of the film in relation to the drum when the film is in its most contracted state. If the film expands slightly, then the distance between the leading edge of two adjacent perforations is greater, and the film will assume the position between two adjacent teeth of the sprocket as indicated by the letter $d$, Figure 9. If the film expands still more, it may occupy the position between two teeth, such as indicated by the letter $e$, Figure 9. Since Figure 9 is merely illustrative, the distances of course are very much exaggerated. In practice the radial distance between the position $c$ of the film and the position $e$ would be something of the order of two-and-one-half thousandths of an inch with a drum of one-half inch radius. Due to the fact that the expansion of the film will cause the sprocket teeth to engage the film at a slightly greater radial distance from the center of the drum, it is desirable that the clearance between the teeth and film, as a particular tooth leaves the film, be rather small as already stated, thereby reducing any lost motion between the tooth and the edge of the perforation that the tooth is to engage.

Not only does the shape of the tooth enter as a factor in compensating for the expansion and contraction of the film, but the resilient drum 10 also lends its aid. It has been previously stated that the resiliency of the material of the drum is such that it may compress not less than one-half of one per cent of the drum radius under normal film tension. This means, again referring to Figure 9, that the resilient material is slightly compressed when the film is in the position $e$ thereby relieving some of the pressure of the film against the sprocket teeth.

When the film has contracted so that it occupies the position $d$, the resilient drum is further compressed and the edges of the film perforations still bear against the teeth but not quite as hard as in the $e$ position.

When the film has contracted, so that it occupies the $c$ position shown in Figure 9, the resilient drum has been compressed still further and the film rests against the teeth at their base with some pressure but with less pressure than the $d$ position and with still less pressure than in the $e$ position. In other words, the resilient material is of such compressibility that in yielding to compression under film tension, said material will exert a counter-pressure against the film in such amount as materially to lessen the pressure of the feeding edges of the film perforations against the sprocket teeth but will not be sufficient totally to eliminate such pressure.

What I claim is:

1. A sprocket wheel having a core of hard material provided with sprocket teeth, said core being covered with a drum of resilient material having depressions therein adjacent each tooth of the sprocket wheel.

2. A sprocket wheel having a core of hard material provided with sprocket teeth, said core being covered with a drum of resilient material, said material being provided with a moat surrounding each sprocket tooth at its base.

3. A sprocket wheel for feeding a perforated sound record film, said wheel having a core of hard material provided with sprocket teeth rigid with the core, said core being covered with a drum of resilient material, the exterior surface of which is smooth and having a low co-efficient of friction in respect of the film surface.

4. A sprocket wheel having a core of hard material provided with sprocket teeth, said core being covered with a drum of resilient material having depressions therein adjacent each tooth of the sprocket wheel, the exterior surface of the resilient material exclusive of said depressions being provided with a surface of low co-efficient of friction.

5. A sprocket wheel for feeding a perforated film, said wheel having a core of hard material provided with sprocket teeth, said core being covered with a drum of resilient material, the diameter of the drum being such as to give the pitch circle a pitch equal to that of the least shrunken film, the compressibility of the resilient material being such that the pressure of the film will reduce the diameter of the pitch circle enough to make the distance between the sprocket teeth at a reduced pitch circle equal to the distance between the perforations of the maximum shrunken film, each portion of the film engaging surface of the tooth conforming to a curve which lies radially within an involute drawn from the root of the said tooth.

WILLIAM L. WOOLF.